United States Patent Office 3,178,491
Patented Apr. 13, 1965

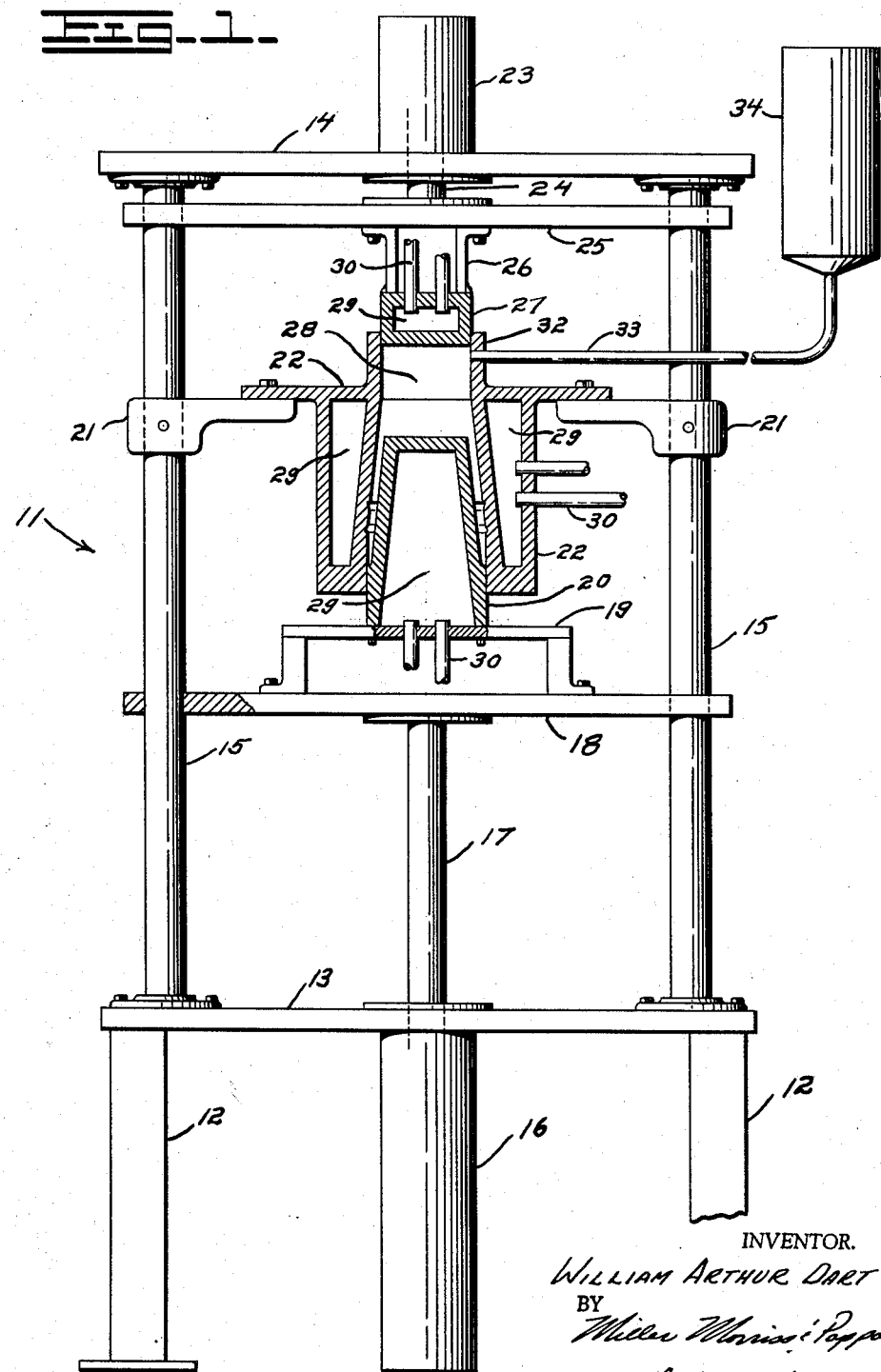

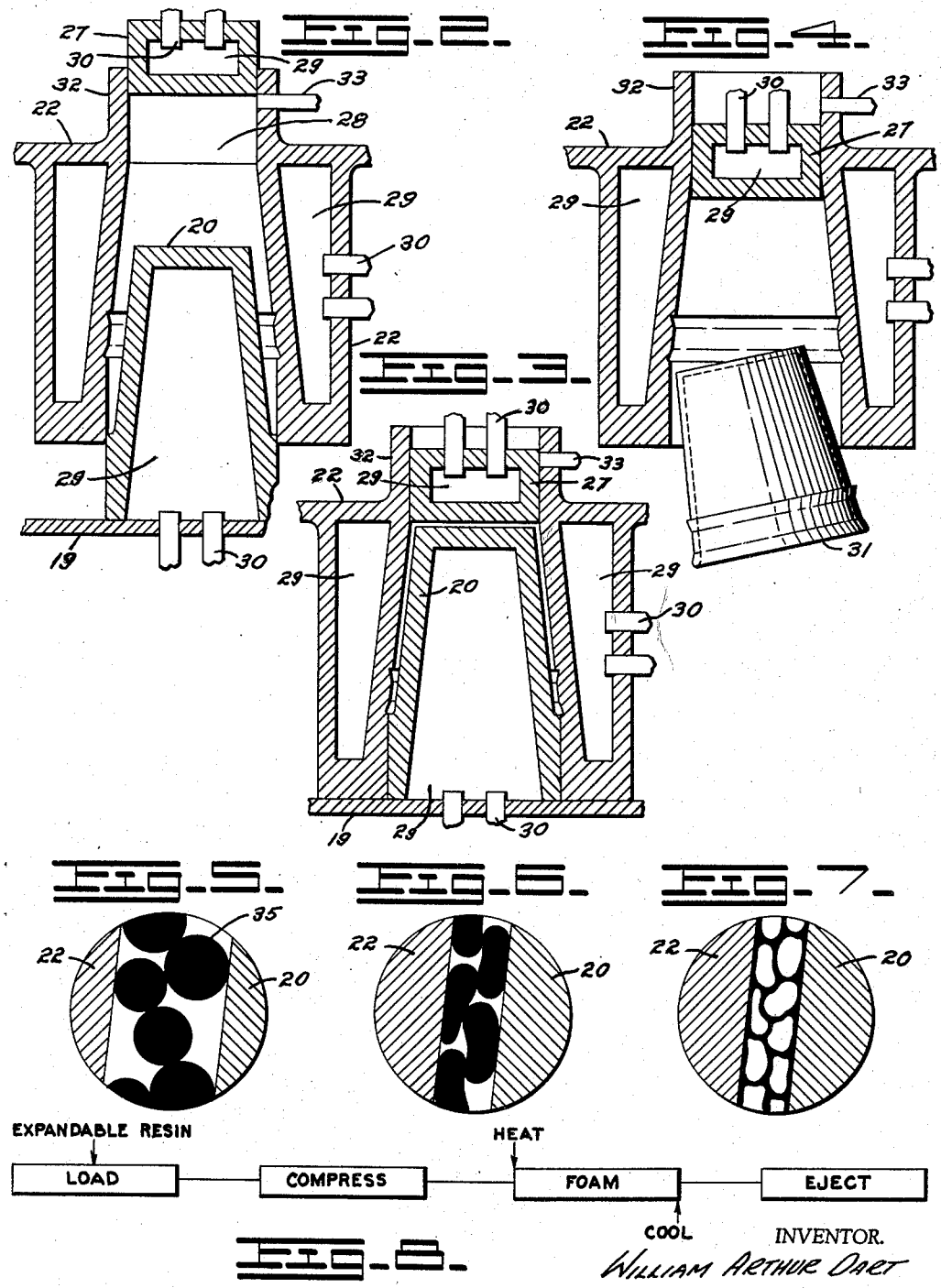

3,178,491
METHOD FOR FORMING THIN WALL CELLULAR PLASTIC CONTAINERS
William Arthur Dart, Mason, Mich., assignor to Dart Manufacturing Company, Mason, Mich., a partnership of Michigan
Filed Nov. 27, 1959, Ser. No. 855,561
3 Claims. (Cl. 264—53)

This invention relates to a method for forming cellular plastic containers and more particularly to a method whereby a compression step is utilized to form a thin wall highly cellular plastic container.

Single wall containers of the prior art have been formed from cellular plastic material in order to achieve insulating characteristics hitherto not found in single wall containers constructed from processed paper, cardboard, metal and the like. The plastic containers of the prior art have generally had to utilize a restricted size of plastic bead or granule in order to adequately fill a mold cavity so as to provide a leak-proof thin-wall container of a certain wall thickness. The formation of thin-wall plastic containers has heretofore required the provision of a "fixed" mold cavity corresponding to the final shape of the container being formed. "Open" mold loading techniques generally used are not applicable to thin wall container work due to the foaming characteristic of the material being utilized. It is inherent that the mold cavity be substantially filled prior to foaming to insure proper results. Care has had to be taken in the formation of the containers to avoid a high incidence of rejects due to defects in the wall surfaces of the containers. These defects have been formed by the uneven foaming caused by improper loading of the resin beads or granules within the mold cavity.

In the devices of the prior art, foamable resins are introduced into fixed molds. Heat is then applied to expandably foam the resins into the shape of the mold cavity. There is no process or apparatus in the known prior art which contemplates the compression of pre-expanded foamable resin beads or granules prior to foaming but after they have been loaded into a mold. For any given wall thickness of the devices of the prior art, the diameter of the pre-expanded beads was automatically limited if a double cell wall thickness was to be maintained. Hence, this has resulted in the use of more resin material.

Another problem encountered in forming of the devices of the prior art has been the fact that only a small portion of the surface area of the spherical pre-expanded beads came into direct contact with the mold wall. This increased the heat transfer time required in the foaming operation and, hence, required a slower cycle thereby limiting the mass production rate per mold of such thin wall containers.

A need has arisen for a method for forming thin wall plastic containers whereby expandable polystyrene beads may be pre-expanded beyond limits of final container wall size so as to result in the use of smaller amounts of resin material per container.

A need has arisen for a method for forming thin wall plastic containers whereby the diameter of the pre-expanded plastic beads is not limited by the final wall thickness of the thin wall container.

A need has therefore existed for the use of an apparatus which physically reduces the volume of pre-expanded resin material in the mold prior to further expansion of the resin within the mold.

A need has therefore also existed for a method for forming cellular plastic containers having a relatively thin wall size while maintaining high insulating effectiveness and leak-proof construction.

In addition, a need has arisen for a method for forming thin wall cellular plastic containers having a relatively high concentration of small cells throughout the body portion of the finished product.

Another need has been the provision of positive quality control over the wall surfaces of the cellular plastic containers so produced.

Yet another need has arisen for a method for forming thin wall plastic containers whereby a greater surface area of the pre-expanded beads is placed in direct contact of the mold wall prior to heating so as to speed-up heat transfer time.

It is therefore an object of this invention to provide a method for the formation of a thin wall plastic container having a compressed cellular body portion.

Another object of this invention is to provide a method for making a thin wall plastic container wherein the pre-expanded resin material is compressed after being loaded into the mold.

Yet another object of this invention is to mold a thin wall cellular plastic container having a minimum of surface defects.

A still further object of this invention is to provide a method for making a cellular plastic container which utilizes a load, compresss, foam, and eject sequence.

Still another object of this invention is to mold a plastic container having a thin wall compressed construction while maintaining high insulating and leak-proof qualities.

Another object of this invention is to provide a method whereby a pre-expanded resin material may be loaded into an "expanded" mold, compressed, and then foamed to create a thin wall cellular plastic container.

Yet another object of this invention is to utilize a mold press apparatus for thin wall containers which is "expanded" for the charging or loading of resin material therein thereby greatly facilitating the loading process.

A further object of this invention is to provide a method for forming a thin wall cellular plastic container from resin material which has been pre-expanded to a degree hitherto not possible thereby resulting in savings of resin material.

Another object of this invention is to provide a method for forming thin wall containers whereby a faster molding cycle is possible due to the increased surface areas of the plastic beads in direct heat transfer contact with the mold walls.

Other objects and advantages found in the construction of my invention will be apparent from a consideration of the following specification in connection with the appended claims and the accompanying drawings.

In the drawings:

FIGURE 1 is a cross-sectional schematic front view illustrating the entire mold press apparatus utilized according to the invention and showing in detail the relative positioning of the actuating mechanisms for the movable components of the mold assembly.

FIGURE 2 is a cross-sectional schematic view illustrating the "expanded" load position of the mold elements and showing the loading channel through which the pre-expanded polystyrene beads are injected to fill the mold cavity.

FIGURE 3 is a cross-sectional schematic view illustrating the compressed "foam" position of the mold elements which determines the final configuration of the thin wall container.

FIGURE 4 is a cross-sectional schematic view illustrating the "ejection" position whereby the mold bottom ejects the finished product and showing a thin wall container being ejected.

FIGURE 5 is an enlarged partial schematic view illustrating in detail the relative positioning of the mold plug and the shell member in their "load" position and showing the pre-expanded polystyrene beads loaded in the expanded mold cavity prior to compression.

FIGURE 6 is an enlarged partial schematic view illustrating in detail the relative positioning of the mold plug and the shell member in their "compressed" position and showing the compressed deformed polystyrene beads presenting an increased surface area against walls of the mold cavity.

FIGURE 7 is an enlarged partial schematic view illustrating the mold plug and shell member still in the "compressed" position but showing the resin material in its final "foamed" state.

FIGURE 8 is a simplified flow diagram setting forth the various steps of the molding cycle and indicating the points at which the pre-expanded polystyrene is introduced into the mold, compressed, heated to foam, cooled, and finally ejected as a thin wall container.

General description

In general, a method is provided for forming thin wall plastic containers from foamable resin material. The method of the instant invention incorporates the use of a compression step in the formation of cellular plastic containers to achieve thin wall construction having high insulating characteristics. The compression step of applicant actually physically reduces the volume of material in the mold after loading. In this particular type of thin wall construction, the mold cavity is substantially filled with pre-expanded resin beads or granules. If the mold cavity is already at its final "mold" position prior to loading, the size of the pre-expanded beads must be limited to a predetermined size if a double cell wall thickness is to be maintained. The incorporation of a compression step into the molding cycle permits a larger or "expanded" mold cavity during the loading step and, hence, a larger size of pre-expanded bead. This results in the use of less resin material per container and hence each container is more economical to produce without any reduction in quality or performance. In addition, the use of an "expanded" mold cavity greatly facilitates and speeds up the loading of the pre-expanded beads into the cavity.

The compression step does not alter the basic cellular construction of the thin wall containers and hence the insulating effectiveness of the applicant's container is not decreased even though the compression step is utilized.

In addition, the compression step deforms the pre-expanded polystyrene beads within the mold cavity so that an increased surface area of the beads comes into direct contact with the mold wall, thereby greatly facilitating heat transfer and thus speeding up the molding cycle.

In general, a suitable mold press frame is provided which supports the mold components. Actuating means are provided for the movable mold components and loading means are associated with the apparatus so as to selectively deliver pre-determined measured amounts of resin into the mold cavity. The mold consists of three main components. Two of these components are movable so as to accomplish the compression step.

A pre-determined metered amount of pre-expanded beads is introduced into the "expanded" mold cavity prior to the compression step. The mold components are provided with heat exchange elements for selectively heating and cooling the mold cavity in order to foamably expand the resin therein so as to form the thin wall containers.

After the foaming operation has been completed, the movable components of the mold cooperate to eject the finished container.

A commercially available steam pre-expander is used to pre-expand the expandable polystyrene beads to any desired size in accordance with plastic molding procedures known in the art and is not shown in the drawings.

As the description becomes more specific, it will be seen that the entire operation is automatically sequenced and the apparatus lends itself to high speed automatic production of thin wall plastic containers.

Specific description

As shown in FIGURE 1, a mold press apparatus is provided for the manufacture of thin wall containers. The frame 11 consists of machine supports 12, lower actuator cross support 13, upper actuator cross support 14, and vertical platen guides 15. A lower air cylinder actuator member 16 having an upwardly extending actuator rod 17 is provided on the lower actuator cross support 13. The upwardly extending actuator rod 17 is connected to and selectively moves the lower platen 18. The lower platen 18 engages the platen guides 15 and is slidable therealong. A mold plug support frame 19 extends upwardly from the lower platen 18 so as to support the tapered plug mold element 20 in its use position. Shell mold supports 21 are provided on the platen guides 15 and may be adjusted to any desired fixed position therealong. The shell mold supports 21 engage the tapered shell mold element 22 and retain it in its fixed use position.

An upper air cylinder actuator member 23 having a downwardly extending actuator rod 24 is provided on the upper actuator cross support 14. The downwardly extending actuator rod 24 is connected to and selectively moves the upper platen 25. The upper platen 25 engages the platen guides 15 and is slidable therealong. Mold bottom supports 26 extend downwardly from the upper platen 25 to support the mold bottom element 27 in its use position. The shell mold element 22 is thus intermediate to and operatively receives the taper plug mold element 20 and the mold bottom element 27 to provide an expandable mold cavity 28. Each of the mold elements are provided with heating and cooling cavities 29. Each of the cavities 29 are provided with heating and cooling lines 30 which selectively provide steam and coolant from any suitable source.

More specifically, a mold assembly is provided having three main components. One of these components is a tapered plug 20 which has an outer surface configuration that defines the shape of the inside surface of the thin-wall container 31 to be formed. The plug 20 is fixedly associated with a lower platen 18 which is movable. The plug 20 has three positions consisting of (1) down-to-eject, (2) intermediate-to-load, and (3) up-to-mold.

The second component of the mold is the cylindrically shaped mold bottom element 27 which defines the bottom of the container 31 to be formed. The mold bottom 27 is fixedly associated with upper platen 25 which is also movable. The mold bottom 27 has three positions consisting of (1) up-to-load, (2) intermediate-to-mold and (3) down-to-eject.

The third component is the internally tapered cylindrical shell 22 whose inner surface defines the outside wall of the container 31. The shell 22 is stationary and is located intermediate to and receives the mold plug 20 and mold bottom 27. The shell element 22 is provided with an upwardly extending flange portion 32 which slidably receives the mold bottom 27. A material pressure feed line 33 is provided through the flange wall 32 through which the pre-expanded polystyrene beads are loaded into the mold cavity 28. The feed line 33 delivers pre-determined amounts of beads from a suitable dispensing supply hopper 34 so as to substantially fill the "expanded" mold cavity 28. Suitable air pressure delivery means are incorporated into the supply hopper dispensing apparatus so as to permit automatic selective delivery of beads to the mold cavity 28. The lower portion of the shell mold member 22 is elongate so as to slidably receive the mold plug element 20. The shell element 22 cooperates with the mold plug element 20 and mold bottom element 27 to define a fully enclosed "expandable" mold cavity 28, as shown schematically in FIGURES 1, 2 and 3. The mold assembly is designed so as to prevent spillage of the resin material when the mold is in its "expanded" or load position.

As shown schematically in the drawings, the mold components are provided with heat exchange cavities 29 to allow selective heating and cooling of the mold cavity so as to foamably expand the resin therein. It is within the scope of this invention to provide any other type of suitable heating and cooling means, if desired.

Actuating means are provided on the mold press apparatus in order to move the mold bottom 27 and plug 20 to the various positions they hold in the molding sequence. Although the actuating means of the preferred embodiment consist of compressed air cylinders, it is within the scope of the invention to utilize electrically operated servomechanisms or any other type of suitable actuating means known in the art.

Sequencing means are also provided to properly regulate the various steps in the molding sequence. These means are well known in the mechanical arts and are not described herein.

More specifically, the molding cycle is as follows:

(1) As shown schematically in FIGURE 4, the completed container 31 from the previous cycle is ejected by movement of the mold bottom element 27 downwardly. The plug element 20 (not shown in FIGURE 4) also has moved downwardly to permit the ejection of the container 31 by the downward movement of the mold bottom 27.

(2) The mold plug 20 and mold bottom 27 each then move upwardly to the "expanded" load or charge position, as shown schematically in FIGURE 2. In this position, the mold plug 20 has not fully entered the shell member 22. The mold bottom 27 is also retracted and therefore, the mold cavity 28 is relatively large which greatly facilitates loading of the pre-expanded polystyrene beads therein. The design of the mold assembly is such that the plastic material does not escape during loading. It will be noted in FIGURES 1 and 2 that the bead inlet line or channel 30 is open to permit loading of the pre-expanded beads into the "expanded" mold cavity 28 when the mold bottom 27 is in its "load" position. The enlarged partial schematic view of FIGURE 5 illustrates the relative positioning of the mold plug 20 and the shell mold element 22 in the "expanded" load position and indicating in detail the pre-expanded polystyrene beads 35 loaded therein.

(3) As shown in FIGURE 3, the mold plug 20 then moves upwardly to the "compress" and "foam" mold position. The mold bottom 27 simultaneously moves downwardly, shutting off the inlet channel 30. This combined movement of mold plug 20 and mold bottom 27 compresses the pre-expanded polystyrene beads between their surfaces and the surface of the intermediate shell member 22. This is shown in FIGURE 6. It will be noted in FIGURE 6 that the compressed beads present a greater surface area against the walls of the mold elements. As shown in FIGURE 5, the beads, prior to compression, are in minimal surface contact with the mold cavity walls. The volume of the mold cavity 28 is thus decreased and the final wall thickness of the container is thus determined. The final mold cavity size is shown in FIGURE 3. Heat is applied to the activities 29 within the mold components so as to foamably expand the compressed bead material into its final shape conforming with the mold cavity 28. FIGURE 7 shows in detail the compressed beads after they have been foamably expanded to form the thin wall container 31. After cooling, the completed piece 31 is then ejected, as shown in FIGURE 4, thus completing the molding cycle.

*Operation*

The preferred embodiment of the thin wall container 31 is formed from raw expandable polystyrene beads or granules which are commercially available. Although the preferred embodiment of the invention has made specific utilization of expandable polystyrene beads or granules, it is considered to be within the scope of the invention to utilize any of the other types of foamable resin material that are commercially available.

In operation, the resin beads are pre-expanded to any desired size in accordance with the particular application. For instance, pre-expansion of the beads to a density of 4 to 5 pounds per cubic foot requires a wall thickness of about one-tenth of an inch if a double layer of beads is to be obtained. A double layer is preferable because it is less likely to produce rejected pieces by insuring leak-proof construction. The density of the pre-expanded beads can be controlled by regulating the feed rates of bead and steam to the pre-expander. This is accomplished in accordance with method and procedures well known in the art. As has been stated previously, the compression step incorporated into the method of applicant permits pre-expansion of the beads to a larger diameter than has been possible previously without increasing the final wall thickness of the container 31. This, of course, results in the use of less resin material in each container 31.

After the expandable polystyrene beads have been pre-expanded, they are fed into the expanded mold cavity 28 when the mold components are in the "expanded" load position. The mold components are then sequentially actuated through the molding cycle consisting of (1) load, (2) compress, (3) foam and (4) eject. This cycle is shown schematically in the diagram of FIGURE 8.

It is thus seen that a thin wall container is provided which has been formed faster and more economically than has heretofore been possible. The incorporation of a compression step into the molding cycle permits use of larger size pre-expanded beads which results in the use of less resin material in each container. In addition, the heating time for foaming is cut down due to the fact that the compressed beads present a greater surface contact area against the wall of the mold components and the heating elements contained therein. It has been found that cycling time is reduced twenty-five percent (25%) due to this increased surface contact area which results in a faster heat transfer rate from mold wall to compressed bead.

Another important advantage of the incorporation of a compression step in the molding cycle is that an "expanded" mold cavity is available during the loading process. Loading during the foam or "mold" position would be more difficult and time-consuming due to the narrow mold cavity required for the thin wall construction of the plastic containers. It is pointed out that the product being formed, a thin wall container, does not lend itself to an "open" mold loading technique as is the usual case.

Although a specific type of mold press apparatus has been described having certain movable mold components, it is within the scope of this invention to vary the design of the mold press in any manner known in the art as long as a compression step is included in the molding sequence.

Various modifications of the invention may be made without departing from the principle thereof. Each of these modifications is to be considered as included in the the hereinafter appended claims unless these claims by their language expressly provide otherwise.

Having thus set forth the nature of my invention, I claim the following:

1. In a method for forming a thin wall cellular plastic container from foamable resin, the steps which include: introducing a measured amount of pre-expanded polystyrene beads into an expanded but closed mold cavity; compressing said pre-expanded polystyrene beads in situ by reducing said cavity size to define a thin wall container final end product; expanding by foaming said compressed pre-expanded polystyrene beads in situ in said reduced cavity thereby forming a thin wall cellular plastic container; ejecting said completed thin wall container from said mold cavity.

2. In a method for forming a thin wall cellular plastic container, the steps which include: filling an expanded but closed mold cavity with pre-expanded polystyrene beads; compressing said beads by decreasing the volume of said cavity to define a thin wall container final end product; formably expanding said compressed polystyrene beads within said decreased cavity so as to form a thin wall container; and ejecting said completed container from said mold cavity.

3. In a method for forming a thin wall cellular plastic container, the steps which includes: filling an oversize expanded but closed mold cavity with pre-expanded plastic beads; compressing said beads in situ by reducing the size of said mold cavity to define a thin wall container final end product; foamably expanding said compressed plastic beads within said reduced mold cavity so as to form a thin wall container; and ejecting said completed container from said mold cavity.

References Cited in the file of this patent

UNITED STATES PATENTS

| | | |
|---|---|---|
| 2,252,277 | Tate et al. | Aug. 12, 1941 |
| 2,384,163 | Flowers | Sept. 4, 1945 |
| 2,449,257 | Tucker | Sept. 14, 1948 |
| 2,714,748 | Sternemann et al. | Aug. 9, 1955 |
| 2,789,332 | Scott | Apr. 23, 1957 |
| 2,888,715 | Frank | June 2, 1959 |
| 2,898,632 | Irwin et al. | Aug. 11, 1959 |
| 2,899,708 | Donaldson et al. | Aug. 18, 1959 |
| 2,951,260 | Harrison | Sept. 6, 1960 |
| 2,958,905 | Newberg et al. | Nov. 6, 1960 |
| 3,030,668 | Taylor | Apr. 24, 1962 |